United States Patent
Lu et al.

(10) Patent No.: US 11,290,723 B2
(45) Date of Patent: Mar. 29, 2022

(54) METHOD FOR VIDEO COMPRESSION PROCESSING, ELECTRONIC DEVICE AND STORAGE MEDIUM

(71) Applicant: BEIJING SENSETIME TECHNOLOGY DEVELOPMENT CO., LTD., Beijing (CN)

(72) Inventors: Guo Lu, Beijing (CN); Wanli Ouyang, Beijing (CN); Xiaoyun Zhang, Beijing (CN); Chunlei Cai, Beijing (CN); Dong Xu, Beijing (CN); Zhiyong Gao, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/082,661

(22) Filed: Oct. 28, 2020

(65) Prior Publication Data

US 2021/0044804 A1    Feb. 11, 2021

Related U.S. Application Data

(63) Continuation of application No. PCT/CN2019/092530, filed on Jun. 24, 2019.

(30) Foreign Application Priority Data

Nov. 29, 2018  (CN) .......................... 201811440753.9

(51) Int. Cl.
*H04N 19/137* (2014.01)
*H04N 19/105* (2014.01)
(Continued)

(52) U.S. Cl.
CPC ............. *H04N 19/137* (2014.11); *G06N 3/08* (2013.01); *H04N 19/105* (2014.11);
(Continued)

(58) Field of Classification Search
CPC .. H04N 19/137; H04N 19/105; H04N 19/124; H04N 19/132; H04N 19/172; G06N 3/08
See application file for complete search history.

(56) References Cited

U.S. PATENT DOCUMENTS 10,332,001 B2    6/2019  Rippel et al.
2018/0173994 A1  6/2018  Rippel et al.
(Continued)

FOREIGN PATENT DOCUMENTS

CN    103037219 A       4/2013
CN    106911930 A   *   6/2017
(Continued)

OTHER PUBLICATIONS

International Search Report in the international application No. PCT/CN2019/092530, dated Sep. 24, 2019, 3 pgs.
(Continued)

*Primary Examiner* — Hesham K Abouzahra
(74) *Attorney, Agent, or Firm* — Cooper Legal Group, LLC

(57) ABSTRACT

A method for video compression processing, an electronic device, and a storage medium. In the method for video compression processing, video compression is performed by using an end-to-end model trained with a single loss function, to obtain video compression information.

16 Claims, 11 Drawing Sheets

S101: obtain first motion information according to a current original frame and a previous reconstruction frame S102: obtain a current prediction frame according to the first motion information and the previous reconstruction frame S103: obtain first residual information according to the current original frame and the current prediction frame

(51) Int. Cl.
*H04N 19/124* (2014.01)
*H04N 19/132* (2014.01)
*H04N 19/172* (2014.01)
*G06N 3/08* (2006.01)

(52) U.S. Cl.
CPC ......... *H04N 19/124* (2014.11); *H04N 19/132* (2014.11); *H04N 19/172* (2014.11)

(56) References Cited

U.S. PATENT DOCUMENTS

| | | | |
|---|---|---|---|
| 2018/0174047 A1 | 6/2018 | Bourdev et al. | |
| 2018/0174052 A1 | 6/2018 | Rippel et al. | |
| 2018/0174275 A1 | 6/2018 | Bourdev et al. | |
| 2018/0176570 A1 | 6/2018 | Rippel et al. | |
| 2018/0176576 A1 | 6/2018 | Rippel et al. | |
| 2018/0176578 A1 | 6/2018 | Rippel et al. | |
| 2019/0278983 A1* | 9/2019 | Iqbal | G06K 9/00355 |
| 2019/0306526 A1* | 10/2019 | Cho | H04N 19/513 |
| 2020/0021815 A1* | 1/2020 | Topiwala | H04N 19/19 |
| 2020/0404296 A1* | 12/2020 | Puri | H04N 19/147 |
| 2020/0404340 A1* | 12/2020 | Xu | G06K 9/6269 |
| 2021/0084290 A1* | 3/2021 | Cho | H04N 19/176 |

FOREIGN PATENT DOCUMENTS

| | | | |
|---|---|---|---|
| CN | 106911930 A | 6/2017 | |
| CN | 107105278 A | 8/2017 | |
| CN | 107197260 A | 9/2017 | |
| CN | 107396124 A | 11/2017 | |
| CN | 108012157 A | 5/2018 | |
| CN | 108171325 A | 6/2018 | |
| CN | 108174218 A | 6/2018 | |
| CN | 108900848 A | 11/2018 | |
| CN | 109451308 A | 3/2019 | |

OTHER PUBLICATIONS

First Office Action of the Chinese application No. 201811440753.9, dated Apr. 3, 2020, 15 pgs.

Second Office Action of the Chinese application No. 201811440753.9, dated Sep. 9, 2020, 7 pgs.

"Variational Image Compression with a Scale Hyperprior"; May 2018; Johannes Balle, David Minnen, Saurabh Singh, Sung Jin Hwang and Nick Johnston; Computer Science, Engineering, Mathematics, Published as a conference paper at ICLR 2018, Corpus ID: 3611540, pp. 1-23.

"DVC: An End-to-end Deep Video Compression Framework"; Apr. 2019; Guo Lu, Wanli Ouyang, Dong Xu, Xiaoyun Zhang, Chunlei Cai and Zhiyong Gao, CVPR 2019 Submission #3657, pp. 11006-11015.

"Video Compression through Image Interpolation", Apr. 18, Chao-Yuan Wu, Nayan Singhai and Philipp Krahanbuhl, Reprinted from the Internet al: https://arxiv.org/abs/1804.06919>, 18 pgs.

DVC: An End-to-end Deep Video Compression Framework, Nov. 2018, Guo Lu, Wanli Ouyang, Dong Xu, Xiaoyun Zhang, Hunlei Cai and Zhiyong Gao, Electrical Engineering and Systems Science, Image and Video Processing v1, Reprinted from the Internet at: https://arxiv.org/abs/1812.00101>, 14 pgs.

"An End-to-End Compression Framework Based on Convolutional Neural Networks", Aug. 2017, Feng Jiand, Wen Tao, Shaohui Liu, Jie Ren, Xun Guo and Debin Zhao, IEEE Transactions on Circuits and Systems for Video Technology, vol. 28, Issue: 10, IEEE, , 2017, Reprinted from the Internet at: https://ieeexplore.ieee.org/document/7999241>, <DOI: 10.1109/TCSVT.2017.2734838>, 13 pgs.

"CNN-Based Bi-Directional Motion Compensation for High Efficiency Video Coding", May 2018, Zhenghui Zhao Shiqi Wang, Shanshe Wang, Xinfeng Zhang, Siwei Ma and Jiansheng Yang, IEEE International Symposium on Circuits and Systems (ISCAS), IEEE, Reprinted from the Interetat: https://ieeexplore.ieee.org/document/8351189>, <DOI: 10.1109/ISCAS.2018.8351189>, 4 pgs.

First Office Action of the Japanese application No. 2020-560352, dated Dec. 21, 2021, 14 pgs.

* cited by examiner

S100: perform video compression by using an end-to-end model trained with a single loss function, to obtain video compression information

FIG. 1

METHOD FOR VIDEO COMPRESSION PROCESSING, ELECTRONIC DEVICE AND STORAGE MEDIUM

CROSS-REFERENCE TO RELATED APPLICATIONS

This application is a continuation of International Application No. PCT/CN2019/092530, filed on Jun. 24, 2019, which claims priority to Chinese patent application No. 201811440753.9, filed on Nov. 29, 2018. The disclosures of International Application No. PCT/CN2019/092530 and Chinese patent application No. 201811440753.9 are hereby incorporated by reference in their entireties.

TECHNICAL FIELD

The present disclosure relates, but is not limited, to the field of information technologies, and particularly relates to a method for video compression processing and apparatus, an electronic device and a storage medium.

BACKGROUND

Video compression is widely applied to various video systems and is of great significance to reduce storage and transmission spaces of videos. At the meantime, many computer vision tasks are very sensitive to the quality of video compression. Therefore, further improving the performance of video compression is also of great help to other video tasks.

SUMMARY

In view of this, embodiments of the present disclosure are intended to provide a method and apparatus for video compression processing, an electronic device and a storage medium.

The technical solutions of the present disclosure are implemented as follows.

A method for video compression processing may include the following operation.

Video compression is performed by using an end-to-end model trained with a single loss function to obtain video compression information.

An apparatus for video compression processing may include a video compression module.

The video compression module is configured to perform video compression by using an end-to-end model trained with a single loss function, to obtain video compression information.

An electronic device may include:

a memory, and a processor, connected to the memory, and configured to execute computer executable instructions stored in the memory to implement method for the video compression processing provided in the above any technical solution.

A computer storage medium stores computer executable instructions; and the computer executable instructions are executed by a processor to implement the method for video compression processing provided in the above any technical solution.

A program product stores computer executable instructions; and the computer executable instructions are executed to implement the method for video compression processing provided in the above any technical solution.

BRIEF DESCRIPTION OF THE DRAWINGS

FIG. 1 is a flowchart schematic diagram of a first method for video compression processing provided by an embodiment of the present disclosure.

DETAILED DESCRIPTION

The technical solutions of the present disclosure are further described below in detail in combination with the accompanying drawings and specific embodiments of the specification.

As shown in FIG. 1, the method for video compression processing provided by the embodiment may include the following step.

In S100, video compression is performed by using an end-to-end model trained with a single loss function, to obtain video compression information.

According to the method for video compression processing provided by the embodiment, video processing is performed by using the end-to-end model trained with the single loss function.

The single loss function herein is a loss function. Regarding the end-to-end model, after a to-be-compressed video is input in to the end-to-end model, the end-to-end model directly outputs video compression information. Herein, the video compression information is information obtained after the video is compressed.

In the embodiment, by use of an end-to-end model, the loss value of each deep learning module in the end-to-end model for the video processing is calculated by a single loss function. Therefore, on one hand, as a single loss function is used to calculate the loss value in training, it can reduce the redundant calculated amount due to the fact that different deep learning modules use different loss functions to calculate the loss values. On the other hand, in the case that the different deep learning models calculate the loss values respectively, accumulation of the loss values will result in uncontrollable or excessive final loss value of the models; while in the embodiment, as the same loss function is used to calculate the loss value of the whole end-to-end model, it can reduce such a situation, and ensure quality of video compression at a predetermined code rate.

Figure 2A:
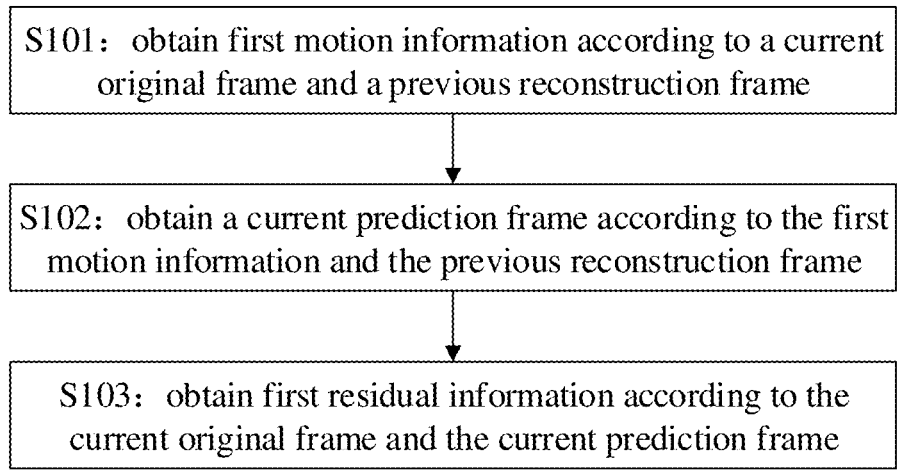
FIG. 2A is a flowchart schematic diagram of a second method for video compression processing provided by an embodiment of the present disclosure.

In some embodiments, as shown in FIG. 2A, Step S100 may include the following steps.

In S101, first motion information is obtained according to a current original frame and a previous reconstruction frame.

In S102, a current prediction frame is obtained according to the first motion information and the previous reconstruction frame.

In S103, first residual information is obtained according to the current original frame and the current prediction frame. The first motion information and the first residual information form the video compression information.

In the embodiment, the video is composed of video frames. These video frames are composed or played in a certain time sequence to form dynamic continuous audio and video information.

The current original frame is a video frame to be compressed. In the embodiment, the first motion information is obtained according to the current original frame and the previous reconstruction frame. Herein, the previous reconstruction frame may be a video frame reconstructed based on compression information obtained from the previous compressed video frame. The previous reconstruction frame corresponds to the previous original frame.

In the embodiment, one video frame corresponds to one reconstruction frame. As the video frames are numbered in a certain sequence, the reconstruction frames are also numbered in a certain sequence. If the current original frame is an $n^{th}$ frame of the video, the previous reconstruction frame is a reconstruction frame of an $(n-1)^{th}$ frame of the video.

If the current original frame is the start frame of the video, i.e., the first frame, the reconstruction frame of the first frame may be formed as follows.

The start frame is input to an encoder to obtain encoding information.

The encoding information is input to a decoder to obtain the reconstruction frame of the start frame. The reconstruction frame of the start frame may be used in reconstruction of the second frame of the video.

Step S101 to Step S103 may be used to process non-start frames of the video.

The first motion information may be used to describe a motion condition of a target pattern in the current original frame and the previous original frame.

For example, the compressed video is a video of a ball game, and differences of one or more team members between different video frames in the video may be described by the first motion information.

The first motion information may specifically be per-pixel differential information between the current original frame and the previous reconstruction frame.

After the first motion information is obtained, the current prediction frame is obtained based on the first motion information and the previous reconstruction frame. For example, specifically, the previous reconstruction frame is projected to obtain a projection frame, and the projection frame is rectified based on the first motion information to obtain the current prediction frame. Herein, the operation that the projection frame is rectified based on the first motion information may include that: pixel coordinates of corresponding pixels in the projection frame are adjusted according to a motion amount of the target pattern in two frames adjacent in time, thereby obtaining the rectified current prediction frame. Certainly, here is only an example. Specifically, there are many manners for acquiring the current prediction frame based on the previous reconstruction frame and the first motion information, and there are no limits on the above manner. The current prediction frame corresponds to a decompression restored video frame that is obtained based on the first residual information and the previous decompression restored frame during decompression of the video. In some embodiments, the previous reconstruction frame and differential information between two adjacent video frames that is characterized by the first motion information may be subjected to weighted summation in a per-pixel manner, to obtain the current prediction frame.

After the current prediction frame is obtained, the current prediction frame and the current original frame are subjected to differential processing and the like, such that the first residual information may be obtained. The first residual information may specifically reflect differential information between the current prediction frame and the current original frame.

In the embodiment, after the first residual information and the first motion information are encoded, the video compression information can be obtained. Both the first residual information and the first motion information indicate the differential information, and therefore compared with the case where the current original frame is directly output, the data size may be greatly reduced, thus implementing compression of the video.

Figure 2B:
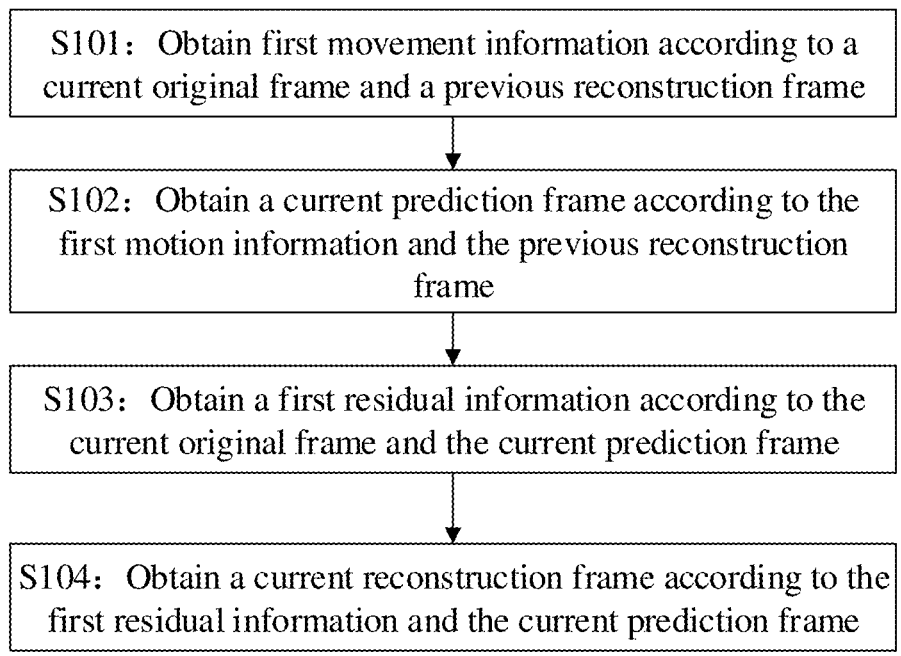
FIG. 2B is a flowchart schematic diagram of a third method for video compression processing provided by an embodiment of the present disclosure.

As shown in FIG. 2B, Step S100 may further include the following step.

In S104, a current reconstruction frame is obtained according to the first residual information and the current prediction frame. The current reconstruction frame and a next original frame are used jointly to obtain first motion information for compression of the next original frame.

In the embodiment, the first residual information and the current prediction frame may be used to obtain the current reconstruction frame, and the current reconstruction frame may be used for compression of the next original frame.

In the embodiment, the previous reconstruction frame is obtained based on the first residual information corresponding to the previous original frame, and the previous prediction frame. Therefore, in the embodiment, Step S101 to Step S104 form a circular process of the video compression.

In some embodiments, Step S102 may include the following operations.

A motion feature is obtained by encoding based on the first motion information.

Second motion information is obtained by decoding based on the motion feature.

The current prediction frame is obtained based on the previous reconstruction frame and the second motion information.

Figure 3:
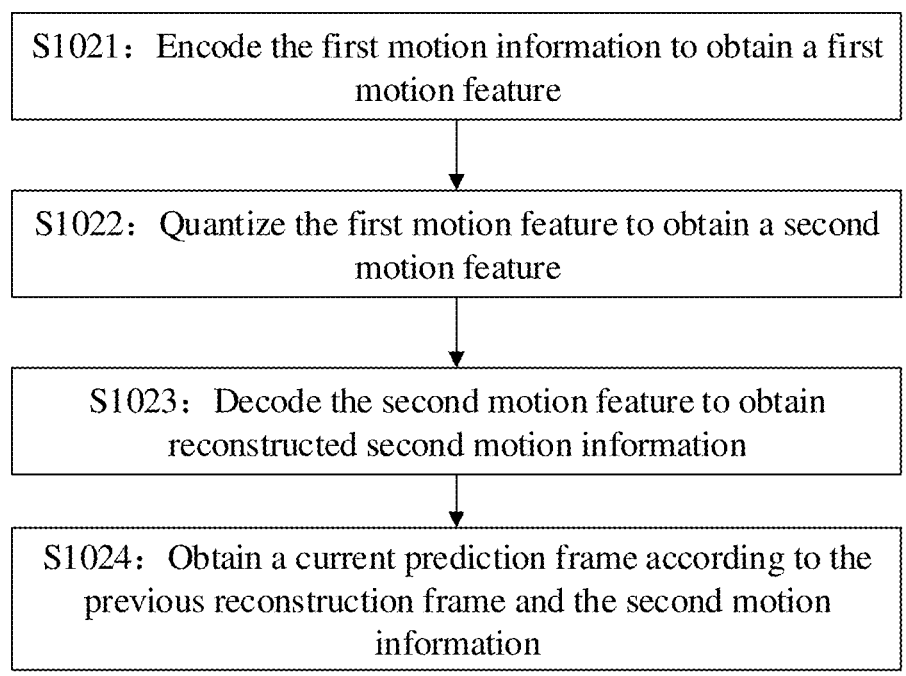
FIG. 3 is a flowchart schematic diagram of a method for generating a current prediction frame provided by an embodiment of the present disclosure.

Specifically, as shown in FIG. 3, Step S102 may include the following steps.

In S1021: the first motion information is encoded to obtain a first motion feature.

In S1022: the first motion feature is quantized to obtain a second motion feature.

In S1023: the second motion feature is decoded to obtain the reconstructed second motion information.

In S1024: the current prediction frame is obtained according to the previous reconstruction frame and the second motion information.

In some embodiments, the first motion information may be information obtained based on comparisons of different frames. The first motion information may be uncoded pixel information in the previous frame. In the embodiment, the first motion information is firstly encoded. For example, the first motion information is encoded by using a predetermined video encoding format to obtain the first motion feature; and at this time, the obtained first motion feature may be considered as analog information to be further quantized.

In Step S1022, the first motion feature is quantized to obtain the quantized second motion feature.

There are many ways for quantizing the first motion feature. For example, the first motion feature is rounded off to obtain the second motion feature. For another example, the first motion feature is rounded up to an integer to obtain the second motion feature. For yet another example, the first motion feature is rounded down to an integer to obtain the second motion feature.

In a training stage of the end-to-end model, the operation that the first motion feature is quantized may further include the following operation.

The first motion feature is added with a preset noise to obtain the second motion feature. As gradient solving of the model is involved in the training process of the model, if the first motion feature is directly rounded off or rounded up to the integer or rounded down to the integer, the gradient solving will become difficult, thus causing abnormality of the training of the end-to-end model. In some embodiments, by introducing the preset noise, the gradient solving may be implemented, thus facilitating training of the end-to-end model.

After the second motion feature is obtained, the decoding is performed based on the second motion feature, thereby simulating the decoding of the second motion feature in a video compression decoding process by the decoding terminal, to obtain the reconstructed second motion information.

At last, in Step S1024, the current prediction frame is generated based on the second motion information and the previous reconstruction frame.

In some embodiments, Step S1021 may specifically include the following operations.

A first convolutional layer convolutes the first motion information to obtain a first encoded value.

A first normalization layer normalizes the first encoded value to obtain a first normalized value.

An $n^{th}$ convolutional layer convolutes an $(n-1)^{th}$ normalized value output by an (n-1)th normalization layer to obtain an $n^{th}$ encoded value.

An $n^{th}$ normalization layer normalizes the $n^{th}$ encoded value to obtain an $n^{th}$ normalized value.

An $N^{th}$ convolutional layer normalizes an $(N-1)^{th}$ normalized value to obtain the first motion feature.

n is a positive integer greater than 1 and smaller than the N, and N denotes the number of convolutional layers.

In the embodiment, a convolutional network may be used to encode the first motion information into the first motion feature. The convolutional network may include: N convolutional layers and (N-1) normalization layers. The convolutional layers and the normalization layers may be distributed alternately. As such, the first convolutional layer (i.e., the $1^{st}$ convolutional layer) of the convolutional network directly receives the first motion information, and convolutes the first motion information to obtain the first encoded value. After the first encoded value is obtained, the first normalization layer (i.e., the $1^{st}$ normalization layer) normalizes the first encoded value. The normalization of the first encoded value herein may be implemented by various normalization methods. There are a variety of specific implementations, and details are not repeated. The normalization herein may also be referred to as a normalized operation.

By repeatedly executing N times of convolution and (N-1) times of normalization, the $n^{th}$ encoded value output by the $N^{th}$ convolution layer, i.e., the first motion feature, is obtained.

N may be a positive integer not smaller than 2. In some embodiments, the N may be 3, 4 or 5 or the like.

In the embodiment, the convolutional parameter used by the first convolutional layer to the $N^{th}$ convolutional layer may be the same. For example, the convolutional parameter may be (M1, M2, S1). M1 denotes an M1*M1 convolution kernel. For instance, M1 may be 3 or 4 or the like. M2 denotes the number of outputs of the convolutional layer. For example, M2 may be 128, 256 or 512 or the like. S2 may be a step size at which the convolution kernel moves. For instance, S1 may be 1 or 2 or the like. If S1 is equal to 1, after an image is input to the convolutional layer for convolution, the obtained output image is maintained unchanged in image size. If the S2 is 2 or a positive integer greater than 2, after the image is input to the convolutional layer for convolution, the obtained image is reduced in size.

In some embodiments, Step S1023 may include the following operations.

A first deconvolutional layer deconvolutes the first motion feature to obtain a first decoded value.

A first denormalization layer denormalizes the first decoded value to obtain a first denormalized value.

An $n^{th}$ deconvolutional layer deconvolutes an $(n-1)^{th}$ denormalized value output by an $(n-1)^{th}$ denormalization layer, to obtain an $n^{th}$ decoded value.

An $n^{th}$ denormalization layer normalizes the $n^{th}$ decoded value, to output an $n^{th}$ denormalized value.

An $N^{th}$ deconvolutional layer deconvolutes an $(N-1)^{th}$ denormalized value, to obtain the second motion information.

n is a positive integer greater than 1 and smaller than the N, and N denotes the number of convolutional layers.

In the embodiment, the decoding of the second motion feature is an inverse process of the encoding of the first motion information. In the embodiment, the second motion information is obtained by using a deconvolutional network. The deconvolutional network includes the same number of deconvolutional layers as the number of the convolutional layers for encoding in the convolutional network. The number of denormalization layers included in the deconvolutional network is the same as the number of normalization layers in the convolutional network for encoding. The deconvolutional layers and the denormalization layers are distributed alternately in the deconvolutional network. In the embodiment, the deconvolutional parameter used by the first deconvolutional layer to the $(N-1)^{th}$ deconvolutional layer corresponds to the convolutional parameter used in the encoding process, and may be (M1, M2, S1). The deconvolutional parameter of the $N^{th}$ deconvolutional layer may be different. For example, the convolution kernel used by the $N^{th}$ deconvolutional layer and the convolution kernel used by the first deconvolutional layer to the $(N-1)^{th}$ deconvolutional layer are the same and both are an M1*M1 convolution kernel. However, the number of input channels may be changed. For example, the deconvolutional parameter used by the first deconvolutional layer to the $(N-1)^{th}$ deconvolutional layer is (3,128,2), and the deconvolutional parameter used by the N$^{th}$ deconvolutional layer may be (3,2,2).

Figure 4:
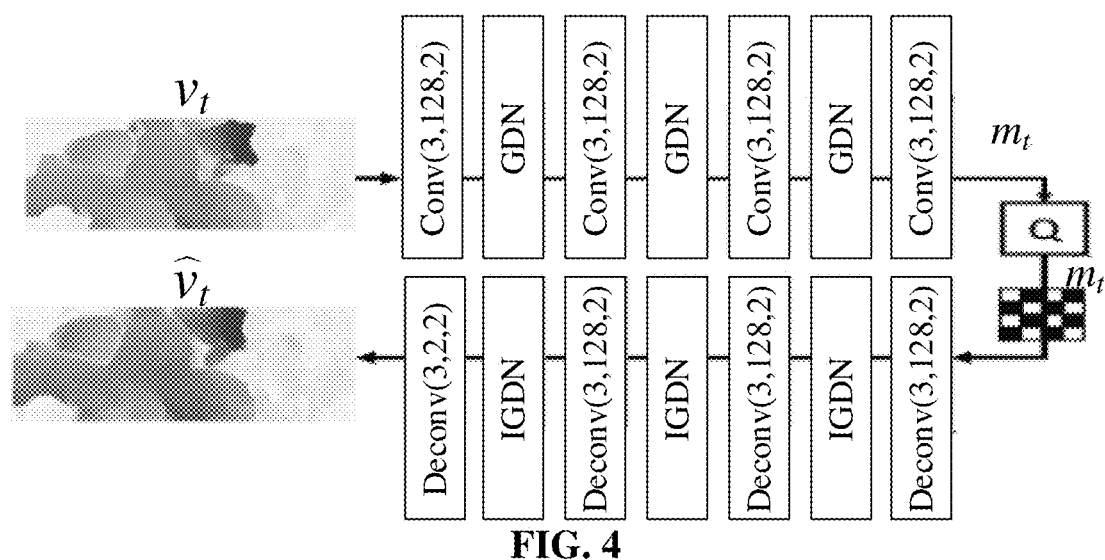
FIG. 4 is a flowchart schematic diagram of a method for encoding and decoding motion information provided by an embodiment of the present disclosure.

In the embodiment, the encoder for the first motion information and the decoder for the second motion feature may be connected together by a quantization network. FIG. 4 is a schematic diagram of a network structure for encoding and decoding motion information. In FIG. 4, GND denotes the normalization layer, the IGDN denotes the denormalization layer, Conv denotes the convolutional layer, and Deconv denotes the deconvolutional layer. In FIG. 4, $v_t$ represents the first motion information, $\hat{v}_t$ represents the second motion information, $m_t$ denotes the first motion feature, and $\hat{m}_t$ denotes the second motion feature. Q is a quantization operation.

Figure 5:
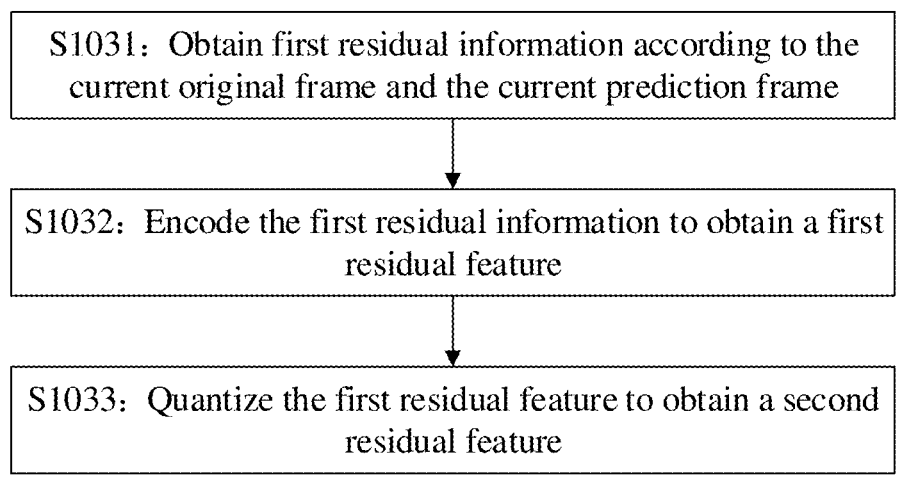
FIG. 5 is a flowchart schematic diagram of a method for generating a second residual feature provided by an embodiment of the present disclosure.

In some embodiments, as shown in FIG. 5, Step S103 may include the following steps.

In S1031, the first residual information is obtained according to the current original frame and the current prediction frame.

In S1032: the first residual information is encoded to obtain a first residual feature.

In S1033: the first residual feature is quantized to obtain a second residual feature.

The second residual feature and the second motion feature formed based on the first motion information are constituent parts of the video compression information.

In the embodiment, the first residual information is obtained based on the current original frame and the current prediction frame. For example, the current original frame and the current prediction frame are directly compared in a per-pixel manner to obtain the first residual information.

Then, the first residual information is encoded to obtain the first residual feature. Likewise, the first residual feature is quantized necessarily to obtain the second residual feature. Herein, the quantization may include that: the first residual feature is rounded off, the first residual feature is rounded up to an integer, or the first residue feature is rounded down to an integer.

During the training stage, the first residual feature may also be added with a predetermined noise to obtain the second residual feature.

In some embodiments, Step S1024 may include the following operations.

The previous reconstruction frame, the second motion information and a projection frame are spliced to obtain a first splicing frame, the projection frame being generated based on convolution of the previous reconstruction frame and the second motion information.

The first splicing frame is convoluted to obtain a first convolutional frame.

(S+1) times of first residual processing and S times of pooling processing are performed on the first convolutional frame to obtain a first intermediate frame, the first residual processing and the pooling processing being performed alternately.

(S+1) times of second residual processing and S times of upsampling processing are performed on the first intermediate frame to obtain a second intermediate frame, the second residual processing and the upsampling processing being performed alternately.

Second convolutional processing is performed on the second intermediate frame to obtain a second convolutional frame.

Third convolutional processing is performed on the second convolutional frame to obtain the current prediction frame.

S may be 2, 3 or 4 or the like.

In the embodiment, the previous reconstruction frame, the second motion information and the projection frame are spliced to obtain the first splicing frame. For example, the previous reconstruction frame may be a W*H*C1 image frame, the second motion information may be W*H*C2, and the projection frame is a W*H*C3 image frame; and then, the first splicing frame obtained by splicing the previous reconstruction frame, the second motion information and the projection frame may be a W*H*(C1+C2+C3) image frame. In the first splicing frame, the data length of each pixel is changed from original C1, C2 or C3 to C1+C2+C3. The projection frame may be an image frame obtained by convoluting the previous reconstruction frame and the second motion information. For example, by convoluting the previous reconstruction frame and the first motion information, the projection frame including the same number of pixels as that of the previous reconstruction frame may be obtained.

For example, if S is equal to 3, Step S1024 may include the following operations.

The previous reconstruction frame, the second motion information and a projection frame are spliced to obtain a first splicing frame, the projection frame being generated based on convolution of the previous reconstruction frame and the second motion information.

The first splicing frame is convoluted to obtain a first convolutional frame.

After linear rectification and convolution processing are performed on the first convolutional frame, residual processing is performed on the first convolutional frame to obtain a first residual frame.

Pooling processing is performed on the first residual frame to obtain a first pooling frame.

After the linear rectification and the convolution processing are performed on the first pooling frame, the residual processing is performed on the first pooling frame to obtain a second residual frame.

The pooling processing is performed on the second residual frame to obtain a second pooling frame.

After the linear rectification and the convolution processing are performed on the second pooling frame, the residual processing is performed on the second pooling frame to obtain a third residual frame.

After the linear rectification and the convolution processing are performed on the third residual frame, the residual processing is performed on the third residual frame to obtain a fourth residual frame.

The fourth residual frame is upsampled to obtain a first upsampling frame.

After the linear rectification and the convolution processing are performed on a second splicing frame, the residual processing is performed on the second splicing frame to obtain a fifth residual frame, the second splicing frame being generated based on the first upsampling frame and the second residual frame.

The fifth residual frame is upsampled to obtain a second upsampling frame.

After the linear rectification and the convolution processing are performed on a third splicing frame, the residual processing is performed on the third splicing frame to obtain a sixth residual frame, the third splicing frame being generated based on the second upsampling frame and the first residual frame.

The sixth residual frame is convoluted to obtain a second convolutional frame.

The second convolutional frame is convoluted to obtain the current prediction frame.

Upon the completion of the splicing, the first splicing frame is obtained; after the first splicing frame is convoluted, the residual processing and the pooling processing are performed for a predetermined number of times alternately; then, the residual processing and the upsampling processing are performed for a predetermined number of times alternately; next, the convolution is performed; and at last, the current prediction frame is output.

Figure 6:
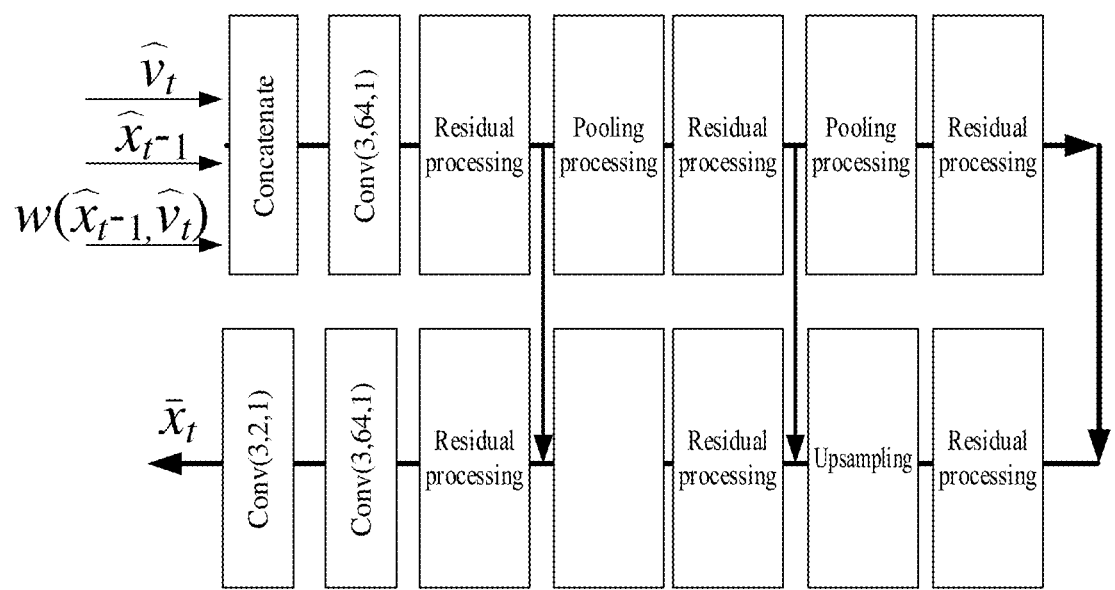
FIG. 6 is a flowchart schematic diagram of another method for generating a current prediction frame provided by an embodiment of the present disclosure.

FIG. 6 is a flowchart schematic diagram of a method for obtaining a current prediction frame. In FIG. 6, $\hat{v}_t$ denotes the second motion information, $w(\hat{x}_{t-1}, \hat{v}_t)$ denotes the projection frame, and the $\bar{x}_{t-1}$ denotes the previous reconstruction frame.

In some embodiments, the upsampling processing is performed in a bilinear interpolation manner.

In the embodiment, the bilinear interpolation may implement upsampling of the data by interpolation in an X direction and a Y direction. The X direction and the Y direction are directions perpendicular to each other. For example, in the image frame, the interpolation may be performed on two adjacent pixel values in rows and columns respectively, thereby increasing the number of pixels included in the image frame.

In some embodiments, a loss value of the end-to-end model is determined based on the first motion information, the first residual information, the current original frame and the current prediction frame by use of the loss function.

Specifically, for example, the first motion information is encoded and quantized to obtain the second motion feature, the first residual information is encoded and quantized to obtain the second residual feature, and both the second motion feature and the second residual feature may be used as independent variables of the loss function to calculate the loss value.

In some embodiments, the loss function may include:

$$\text{Loss} = d(x_t, \hat{x}_t) + \lambda(H(\hat{m}_t) + H(\hat{y}_t))$$

where Loss is the loss value, $d(x_t, \hat{x}_t)$ is the distortion value between the current frame and the current reconstruction frame, $\hat{m}_t$ is the second motion feature obtained by encoding and quantizing the first residual information, $\hat{y}_t$ is the second residual feature obtained by encoding and quantizing the first residual information, $H(\hat{m}_t)$ is the number of codewords obtained by encoding $\hat{m}_t$, $H(\hat{y}_t)$ is the number of codewords obtained by encoding $\hat{y}_t$, and $\lambda$ is a balance coefficient between the code rate and the distortion.

In some embodiments, $d(x_t, \hat{x}_t)$ may be a Peak Signal to Noise Ratio (PSNR) between the current original frame and the current reconstruction frame. For example, PSNR=10*log 10((2^n−1)^2/MSE), MSE being a mean square error between the current original frame and the current reconstruction frame.

In some embodiments, $d(x_t, \hat{x}_t)$ may be determined based on a Structural Similarity Index (SSIM) or a Multi-Scale-Structural Similarity Index (MS-SSIM) between the current original frame and the current reconstruction frame.

The code rate on the $\hat{m}_t$ and the code rate on the $\hat{y}_t$ are the same, so the $\hat{m}_t$ and the $\hat{y}_t$ have the same cost. At this time, the $\lambda$ is the balance coefficient between the code rate and the distortion. In a case where the $\lambda$ keeps unchanged, the larger the number of codewords obtained by encoding the $\hat{m}_t$ and the $\hat{y}_t$ is, the larger the loss value is; and the smaller the number of codewords obtained by encoding the $\hat{m}_t$ and the $\hat{y}_t$ is, the smaller the loss value is.

In some embodiments, $\lambda$ is adjustable, and different end-to-end models have different $\lambda$s. The larger the $\lambda$ is, the smaller the influence of the $d(x_t, \hat{x}_t)$ is, and the larger the influence of the code rate on the loss of the end-to-end model is.

In the embodiment, when the $\lambda$ of the loss function is large enough, the loss function may be equivalent to:

$$\text{Loss} = \lambda(H(\hat{m}_t) + H(\hat{y}_t)).$$

In a case where the number of codewords obtained by encoding the end-to-end model is relatively small or the $\lambda$ is relatively small, the loss function may be equivalent to:

$$\text{Loss} = d(x_t, \hat{x}_t).$$

To sum up, the end-to-end model is used in the embodiment for video compression encoding, such that the obtained video compression information may well balance the code rate and the video distortion. On one hand, the restoration effect of the compressed video is ensured, and on the other hand, the enough compression rate may be guaranteed, and therefore a good balance is achieved between the video compression effect and the compression rate.

An embodiment provides a video compression processing apparatus, which may include: a video compression module.

The video compression module is configured to use an end-to-end model trained with a single loss function to perform video compression to obtain video compression information.

In the embodiment, the end-to-end module may include multiple deep learning models for video compression. Nevertheless, these deep learning models use the same loss function to calculate the loss, such that the loss output of the whole end-to-end module may be well controlled, the compression effect of video compression is ensured, and a good balance is achieved between the code rate and the distortion.

In some embodiments, the video compression processing apparatus may further include: a storage module, configured to store information. For example, the storage module may be configured to cache a reconstruction frame of a current original frame or a previous original frame, etc. The storage module is connected to the video compression module, and configured to provide an information storage space for video compression processing.

Figure 7:
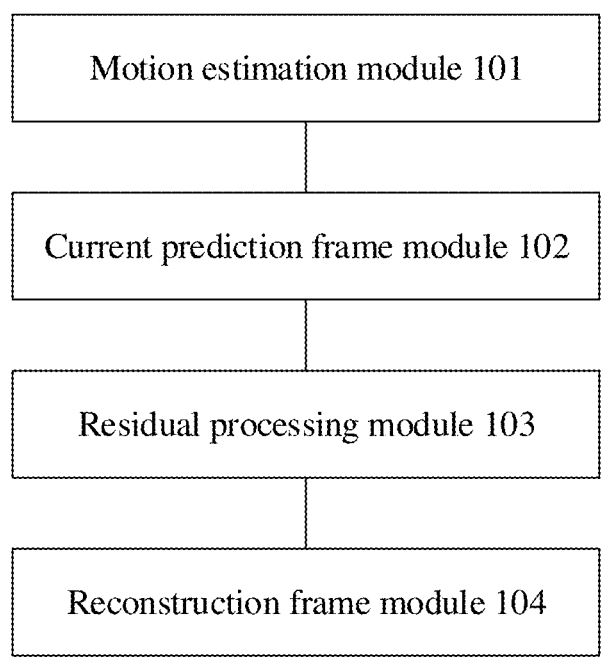
FIG. 7 is a structural schematic diagram of an apparatus for video compression processing provided by an embodiment of the present disclosure.

In some embodiments, as shown in FIG. 7, the video compression module may include: a motion estimation module 101, a current prediction frame module 102, and a residual processing module 103.

The motion estimation module 101 is configured to obtain first motion information according to a current original frame and a previous reconstruction frame.

The current prediction frame module 102 is configured to obtain a current prediction frame according to the first motion information and the previous reconstruction frame.

The residual processing module 103 is configured to obtain first residual information according to the current original frame and the current prediction frame. The first motion information and the first residual information form the video compression information.

In some embodiments, as shown in FIG. 7, the video compression module may further include: a reconstruction frame module 104.

The reconstruction frame module 104 is configured to obtain a current reconstruction frame according to the first residual information and the current prediction frame. The current reconstruction frame and a next original frame are used jointly to obtain first motion information for compression of the next original frame.

In some embodiments, the current prediction frame module 102 may be configured to obtain a motion feature based the first motion information; perform decoding based on the motion feature, to obtain second motion information; and obtain the current prediction frame based on the previous reconstruction frame and the second motion information.

In some embodiments, the current prediction frame module 102 may include: a motion information encoder submodule, a first quantization submodule, a motion information decoder submodule and a motion compensation submodule.

The motion information encoder submodule is configured to encode the first motion information to obtain a first motion feature.

The first quantization submodule is configured to quantize the first motion feature to obtain a second motion feature.

The motion information decoder submodule is configured to decode the second motion feature to obtain the reconstructed second motion information.

The motion compensation submodule is configured to obtain the current prediction frame according to the previous reconstruction frame and the second motion information.

In some embodiments, the motion information encoder submodule may include: a first convolutional layer, a first normalization layer, an $n^{th}$ convolutional layer, an $n^{th}$ normalization layer, and an $N_{th}$ deconvolutional layer.

The motion information encoder submodule may include: the first convolutional layer, the first normalization layer, the $n^{th}$ convolutional layer, the $n^{th}$ normalization layer, and the $N_{th}$ deconvolutional layer.

The first convolutional layer is configured to convolute the first motion information to obtain a first encoded value.

The first normalization layer is configured to normalize the first encoded value to obtain a first normalized value.

The $n^{th}$ convolutional layer is configured to convolute an (n−1)th normalized value output by an (n−1)th normalization layer to obtain an $n^{th}$ encoded value.

The $n^{th}$ normalization layer is configured to normalize the $n^{th}$ encoded value to obtain an $n^{th}$ normalized value.

The $N_{th}$ deconvolutional layer is configured to deconvolute an $(N-1)^{th}$ denormalized value to obtain the second motion information.

n is a positive integer greater than 1 and smaller than N, and N denotes the number of convolutional layers.

In some embodiments, the motion information decoder submodule may include: a first deconvolutional layer, a first denormalization layer, an $n^{th}$ deconvolutional layer, an $n^{th}$ denormalization layer, and an $N^{th}$ deconvolutional layer.

The first deconvolutional layer is configured to deconvolute the first motion feature to obtain a first decoded value.

The first denormalization layer is configured to denormalize the first decoded value to obtain a first denormalized value.

The $n^{th}$ deconvolutional layer is configured to deconvolute an $(n-1)^{th}$ denormalized value output by an $(n-1)^{th}$ denormalization layer, to obtain an $n^{th}$ decoded value.

The $n^{th}$ denormalization layer is configured to normalize the $n^{th}$ decoded value to output an $n^{th}$ denormalized value.

The $N^{th}$ deconvolutional layer is configured to deconvolute an $(N-1)^{th}$ denormalized value to obtain the second motion information.

n is a positive integer greater than 1 and smaller than the N, and N is a number of convolutional layers.

In some embodiments, the residual processing module 103 may include: a residual information obtaining submodule, a residual encoder submodule and a second quantization submodule.

The residual information obtaining submodule is configured to obtain the first residual information according to the current original frame and the current prediction frame.

The residual encoder submodule is configured to encode the first residual information to obtain a first residual feature.

The second quantization submodule is configured to quantize the first residual feature to obtain a second residual feature.

The second residual feature, and the second motion feature formed based on the first motion information are constituent parts of the video compression information.

In some embodiments, the motion compensation submodule may include: a splicing layer, a first convolution layer, a first intermediate processing block, a second intermediate processing block, a second convolutional layer and a third convolutional layer.

The splicing layer is configured to splice the previous reconstruction frame, the second motion information and a projection frame to obtain a first splicing frame. The projection frame is generated based on convolution of the previous reconstruction frame and the second motion information.

The first convolutional layer is configured to convolute the first splicing frame to obtain a first convolutional frame.

The first intermediate processing block is configured to perform (S+1) times of first residual processing and S times of pooling processing based on the first convolutional frame to obtain a first intermediate frame. The first residual processing and the pooling processing are performed alternately.

The second intermediate processing block is configured to perform (S+1) times of second residual processing and S times of upsampling processing on the first intermediate frame to obtain a second intermediate frame. The second residual processing and the upsampling processing are performed alternately.

The second convolutional layer is configured to perform second convolutional processing on the second intermediate frame to obtain a second convolutional frame.

The third convolutional layer is configured to perform third convolutional processing on the second convolutional frame to obtain the current prediction frame.

In some embodiments, the first intermediate layer may include one or more residual block and pooling layers; and/or, the second intermediate layer may include one or more residual blocks and upsampling layers.

For example, the first intermediate layer may include: a first residual block, a first pooling layer, a second residual block, a second pooling layer, and a third residual block.

The first residual block is configured to perform, after performing linear rectification and convolution processing on the first convolutional frame, residual processing on the first convolutional frame to obtain a first residual frame.

The first pooling layer is configured to perform pooling processing on the first residual frame to obtain a first pooling frame.

The second residual block is configured to perform, after performing the linear rectification and the convolution processing on the first pooling frame, the residual processing on the first pooling frame to obtain a second residual frame.

The second pooling layer is configured to perform the pooling processing on the second residual frame to obtain a second pooling frame.

The third residual block is configured to perform, after performing the linear rectification and the convolution processing on the second pooling frame, the residual processing on the second pooling frame to obtain a third residual frame.

And/or,

The second intermediate layer may include: a fourth residual block, a first upsampling layer, a fifth residual block, a second upsampling layer, a sixth residual block, a second convolutional layer and a third convolutional layer.

The fourth residual block is configured to perform, after performing the linear rectification and the convolution processing on the third residual frame, the residual processing on the third residual frame to obtain a fourth residual frame.

The first upsampling layer is configured to upsample the fourth residual frame to obtain a first upsampling frame.

The fifth residual block is configured to perform, after performing the linear rectification and the convolution processing on a second splicing frame, the residual processing on the second splicing frame to obtain a fifth residual frame, the second splicing frame being generated based on the first upsampling frame and the second residual frame.

The second upsampling layer is configured to upsample the fifth residual frame to obtain a second upsampling frame.

The sixth residual block is configured to perform, after performing the linear rectification and the convolution processing on a third splicing frame, the residual processing on the third splicing frame to obtain a sixth residual frame, the third splicing frame being generated based on the second upsampling frame and the first residual frame.

The second convolutional layer is configured to convolute the sixth residual frame to obtain a second convolutional frame.

The third convolutional layer is configured to convolute the second convolutional frame to obtain the current prediction frame.

In some embodiments, the upsampling processing uses a bilinear interpolation manner.

In some embodiments, a loss value of the end-to-end model is determined based on the first motion information, the first residual information, the current original frame and the current prediction frame by the use of the loss function.

In some embodiments, the loss function may include:

$$Loss = d(x_t, \hat{x}_t) + \lambda(H(\hat{m}_t) + H(\hat{y}_t))$$

where, the Loss is the loss value, the $d(x_t, \hat{x}_t)$ is the distortion value between the current frame and the current reconstruction frame, the $\hat{m}_t$ is the second motion feature obtained by encoding and quantizing the first residual information, the $\hat{y}_t$ is the second residual feature obtained by encoding and quantizing the first residual information, the $H(\hat{m}_t)$ is the number of codewords obtained by encoding the $\hat{m}_t$, the $H(\hat{y}_t)$ is the number of codewords obtained by encoding the $\hat{y}_t$, and the $\lambda$ is a balance coefficient between the code rate and the distortion.

A specific example is provided below in combination with the above any embodiment.

The example establishes a complete end-to-end optimized video compression system based on deep learning. All key modules for video encoding may include: a motion estimation module, a motion compensation module, a motion information compression module, a residual information compression module, a quantization module and a code rate estimation module, etc. All modules are implemented by the use of a deep neutral network, and may implement the complete end-to-end optimization.

During optimization, the video compression architecture based on the deep neutral network provided by the example gives full considerations to the balance between quality of a reconstructed image and a code rate required by compression, and can implement higher compression efficiency.

Concerning motion estimation and motion information compression, the example uses an optical flow obtained through a corresponding optical flow estimation neutral network, as motion information.

At the meantime, the example provides a motion information compression network to perform the following processing for video compression.

First step: an estimated optical flow is compressed to obtain a corresponding motion feature, and the motion feature is quantized and then decoded by a motion decoder to obtain corresponding reconstruction motion information.

Second step: motion compensation is performed, including that: motion compensation is performed on the reconstruction motion information obtained in the first step, and residual information is calculated according to a motion compensation result.

Third step: residual encoding is performed, including that: the residual information in the second step is firstly encoded by a residual encoder and then quantized to obtain a quantized residual feature. Then, the quantized residual is decoded by a residual decoder to obtain a corresponding reconstruction residual.

Fourth step: entropy encoding is performed, including that: the number of encoded codewords is estimated according to the motion feature obtained in the first step and the residual feature obtained in the third step. Herein, the codewords obtained by the entropy encoding may serve as video compression information to output.

Fifth step: reconstruction is performed, including: the motion compensation frame obtained in the second step and the reconstruction residual obtained in the third step are added together to obtain a final reconstruction image, namely, an encoded image.

Sixth step: for the motion estimation and the motion information compression, the example uses a optical flow estimation neutral network Spynet to obtain the corresponding motion information. Other learning-based optical flow networks may also be used herein. In order to compress the motion information, a network of an auto-encoder type is provided to compress the motion information.

Figure 8:
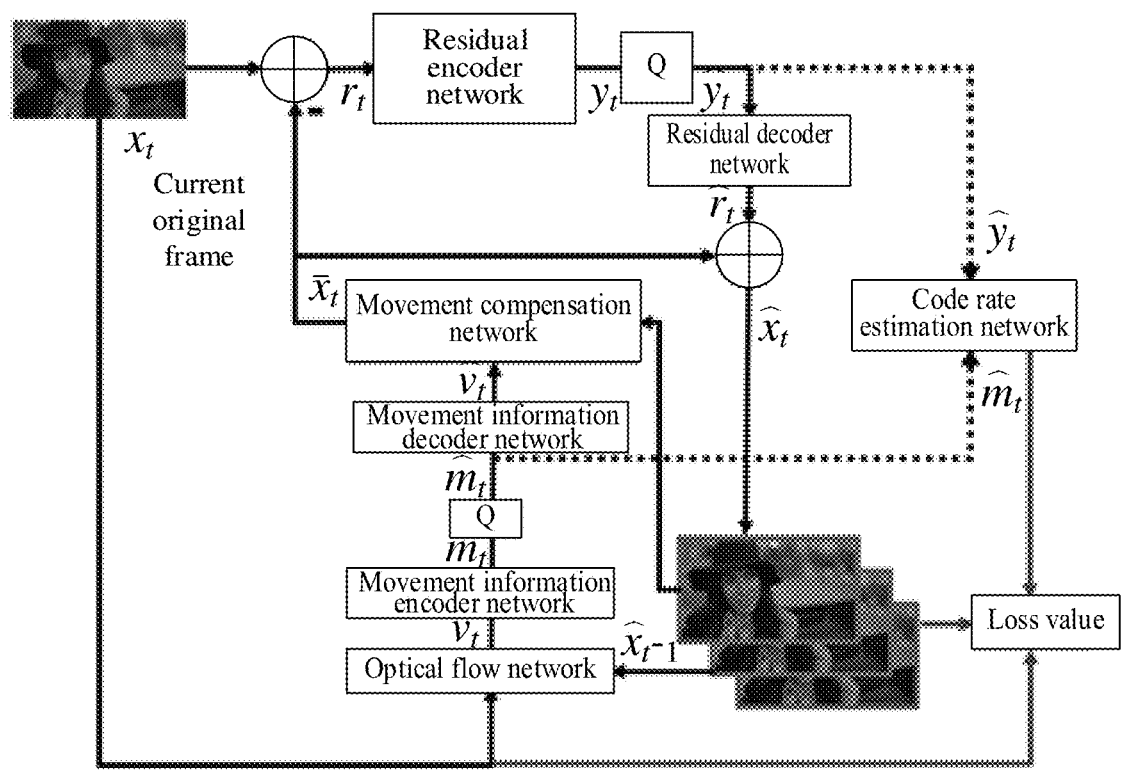
FIG. 8 is a flowchart schematic diagram of a fourth method for video compression processing provided by an embodiment of the present disclosure.

As shown in FIG. 8, the motion information obtained by the optical flow network is $v_t$; and the motion information firstly passes through a motion information encoder submodule (MV Encoder Net) to obtain the motion feature $m_t$, the Q denotes a quantization operation; and the quantized result is $\hat{m}_t$. The $m_t$ passes through a MV Decoder Net to obtain corresponding reconstructed motion information $\hat{v}_t$. The corresponding MV Encoder Net and MV Decoder Net are as illustrated in FIG. 6.

The convolutional parameter of the convolution layer may be conv(3, 128, 2); and the conv(3, 128, 2) represents a standard convolutional operation of which the convolution kernel is 3*3, the output channel is 128 and the step size is 2.

The deconvolutional parameter of the deconvolutional layer may be Deconv(3, 128, 2). The Deconv(3, 128, 2) represents a standard deconvolutional operation of which the convolutional kernel is 3*3, the output channel is 128, and the step size is 2; the GDN represents corresponding normalization, and the IGDN represents denormalization.

For the motion compensation, the example provides a motion compensation network for obtaining a corresponding prediction frame $\bar{x}_t$, with the following specific steps.

Figure 9:
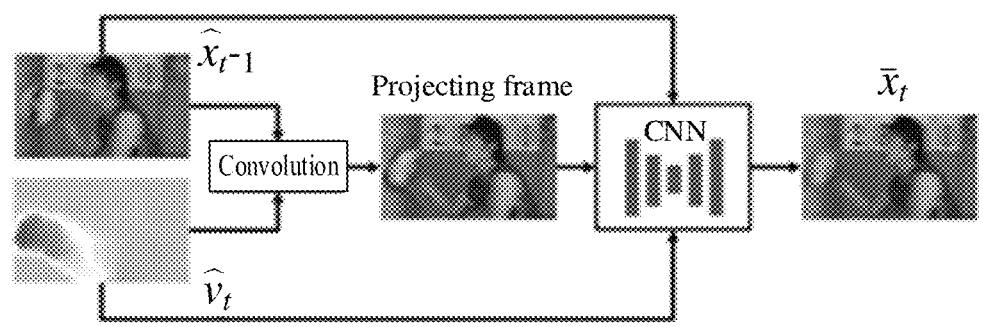
FIG. 9 is a schematic diagram of a method for generating a current prediction frame based on a previous reconstruction frame and second motion information provided by an embodiment of the present disclosure.

Firstly, referring to FIG. 9, with the reconstructed motion information, the reconstruction frame $\bar{x}_{t-1}$ at the previous moment is projected to the current moment to obtain the projection frame or the initial warped frame. Then, the warped frame, the previous reconstruction frame and the reconstructed motion information are spliced together, and input to a Convolutional Neural Network (CNN) to obtain the corresponding prediction frame $\bar{x}_t$. In FIG. 9, the CNN denotes the convolutional network.

Figure 10:
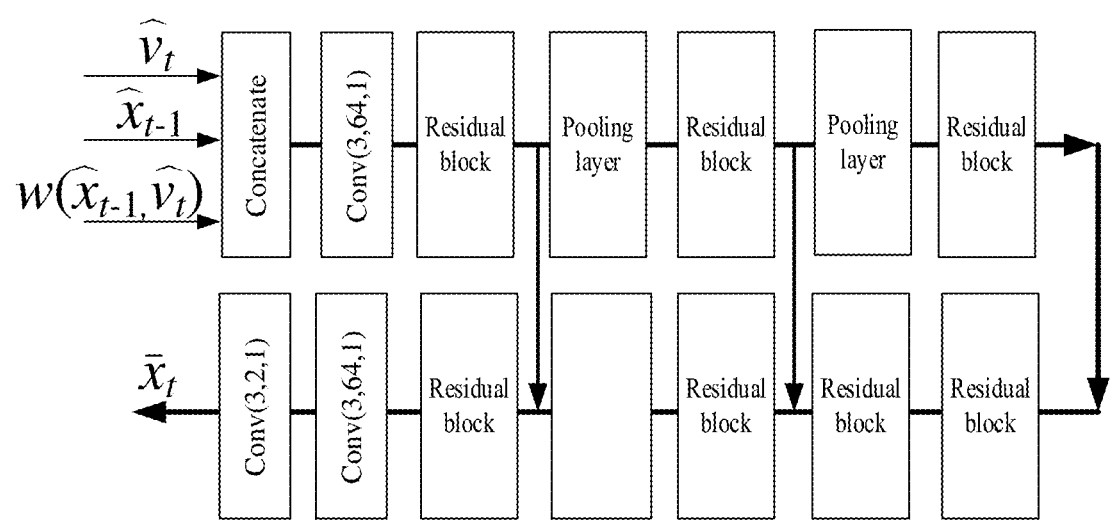
FIG. 10 is a schematic diagram of another method for generating a current prediction frame based on a previous reconstruction frame and second motion information provided by an embodiment of the present disclosure.

The convolutional network shown in FIG. 8 is illustrated in FIG. 10.

The $w(\hat{x}_{t-1}, \hat{v}_t)$ denotes the projection frame. The residual block represents a common residual network. The residual block may include: a Rectified Linear Unit (ReLU) and a convolutional layer. The ReLU may be configured to rectify input data. For example, the ReLU rectifies some abnormal values with an activation function, etc. The residual block may include: ReLUs and convolutional layers having a same number, the ReLUs and convolutional layers being arranged alternately. In the example, the ReLUs are arranged before the convolutional layers. For example, the residual block may include: two ReLUs and two convolutional layers.

In the example, the prediction frame generation network may further include: a pooling layer. The pooling layer performs downsampling on the image frame via a pooling operation. The upsampling layer is a layer corresponding to the pooling layer. It may be considered that the pooling layer and the upsampling layer are inverse to each other. In the upsampling process, upsampling is performed by bilinear interpolation.

The residual encoder network (corresponding to the above residual encoder submodule) and the residual decoder network (corresponding to the above residual decoder submodule) are illustrated in FIG. 6.

Residual information $r_t$ may be obtained according to the prediction frame and the original frame. The $\hat{y}_t$ is input to the residual encoder to obtain the residual feature $y_t$, which is quantized to obtain $\hat{y}_t$. The $\hat{y}_t$ is input to the residual decoder to obtain $\hat{r}_t$. A current correlation network for image compression may be used for both the residual encoder network and the residual decoder network.

Entropy encoding is performed. The quantized motion feature $\hat{m}_t$ and the quantized residual feature $\hat{y}_t$ are input to the corresponding code rate estimation network to obtain the corresponding number of codewords.

An embodiment of the present disclosure provides an electronic device, which may include:

a memory, configured to store information; and a processor, connected to the memory, and configured to execute computer executable instructions stored in the memory to implement the method for video compression processing provided in the above one or more technical solutions, such as one or more methods shown in FIG. 1, FIG. 2A, FIG. 2B, FIG. 3, FIG. 4, FIG. 5, FIG. 6, FIG. 8, FIG. 9 and FIG. 10.

The memory may be various types of memories, and may be a Random Access Memory (RAM), a Read-Only Memory (ROM) and a flash memory, etc. The memory may be configured to store the information, for example, store the computer executable instruction, etc. The computer executable instruction may be various program instructions, such as a target program instruction and/or a source program instruction.

The processor may be various types of processors, such as a central processor, a microprocessor, a digital signal processor, a programmable array, a digital signal processor, an Application Specific Integrated Circuit (ASIC) or an image processor. The processor may be connected to the memory through a bus. The bus may be an integrated circuit bus, etc.

In the embodiment, the electronic device may be various types of electronic devices in which a drawing client runs, such as a desktop, a notebook computer, a tablet computer or a wearable device.

In some embodiments, the terminal device may further include: a communication interface; and the communication interface may include: a network interface such as a local area network interface, a transceiving antenna, etc. The communication interface is likewise connected to the processor, and can be configured to transceive the information.

In some embodiments, the terminal device may further include a man-machine interaction interface. For example, the man-machine interaction interface may include various input/output devices, such as a keyboard, and a mouse.

An embodiment of the present disclosure provides a computer storage medium; the computer storage medium stores computer executable codes; and the computer executable codes are executed to implement the method for video compression processing provided in the above one or more technical solutions, such as one or more methods shown in FIG. 1, FIG. 2A, FIG. 2B, FIG. 3, FIG. 4, FIG. 5, FIG. 6, FIG. 8, FIG. 9 and FIG. 10.

The storage medium includes: various media capable of storing the program code such as a mobile storage device, an ROM, an RAM, a magnetic disk or an optical disc. The storage medium may be a non-instantaneous storage medium.

An embodiment of the present disclosure provides a computer program product; the computer program product includes computer executable instructions; and the computer executable instructions are executed to implement the method for video compression processing provided in the above any embodiment, such as one or more methods shown in FIG. 1, FIG. 2A, FIG. 2B, FIG. 3, FIG. 4, FIG. 5, FIG. 6, FIG. 8, FIG. 9 and FIG. 10.

According to the technical solutions provided by the embodiments of the present disclosure, video compression is performed by using an end-to-end model trained with a single loss function. Therefore, compared with a non-end-to-end model formed by combining multiple deep learning modules trained with different loss functions, the phenomenon of large video compression distortion caused by accumulation of loss values of the deep learning modules is reduced, and the video compression effect is improved. At the meantime, the single loss function may generally balance the code rate and the loss value of the video compression information, such that the code rate is improved in general as much as possible, while a certain distortion rate can be kept.

In the several embodiments provided in the present disclosure, it should be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each function unit in each embodiment of the present disclosure may be integrated into a processing module, each unit may also exist independently, and two or more than two units may also be integrated into one unit. The integrated unit may be implemented in a hardware form, and may also be implemented in form of hardware and software function unit.

Those of ordinary skill in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disc.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subjected to the scope of protection of the claims.

The invention claimed is:

1. A method for video compression processing, executed by a processor of an electronic device, the method comprising:
    performing video compression by using an end-to-end model trained with a single loss function, to obtain video compression information, comprising:
        obtaining first motion information according to a current original frame and a previous reconstruction frame;
        obtaining a current prediction frame according to the first motion information and the previous reconstruction frame; and
        obtaining first residual information according to the current original frame and the current prediction frame, the first motion information and the first residual information forming the video compression information,
    wherein a loss value of the end-to-end model is determined with the single loss function, based on the first motion information, the first residual information, the current original frame, and the current prediction frame.

2. The method of claim 1, wherein performing video compression by using the end-to-end model trained with the single loss function, to obtain the video compression information, further comprises:
    obtaining a current reconstruction frame according to the first residual information and the current prediction frame, the current reconstruction frame and a next original frame being used jointly to obtain the first motion information for compression of the next original frame.

3. The method of claim 1, wherein obtaining the current prediction frame according to the first motion information and the previous reconstruction frame comprises:

obtaining a motion feature based on the first motion information;
    obtaining second motion information by decoding based on the motion feature; and
    obtaining the current prediction frame based on the previous reconstruction frame and the second motion information.

4. The method of claim 3, wherein obtaining the motion feature based on the first motion information comprises:
    encoding the first motion information to obtain a first motion feature;
    wherein the method further comprises:
        quantizing the first motion feature to obtain a second motion feature; and
    wherein obtaining the second motion information by decoding based on the motion feature comprises:
        decoding the second motion feature to obtain the second motion information.

5. The method of claim 4, wherein encoding the first motion information to obtain the first motion feature comprises:
    convoluting, by a first convolutional layer, the first motion information to obtain a first encoded value;
    normalizing, by a first normalization layer, the first encoded value, to obtain a first normalized value;
    convoluting, by an $n^{th}$ convolutional layer, an $(n-1)^{th}$ normalized value output by an $(n-1)^{th}$ normalization layer, to obtain an $n^{th}$ encoded value;
    normalizing, by an $n^{th}$ normalization layer, the $n^{th}$ encoded value, to obtain an $n^{th}$ normalized value; and
    normalizing, by an $N^{th}$ convolutional layer, an $(N-1)^{th}$ normalized value to obtain the first motion feature,
    where n is a positive integer greater than 1 and smaller than N, and N denotes a number of convolutional layers.

6. The method of claim 5, wherein decoding the second motion feature to obtain the second motion information comprises:
    deconvoluting, by a first deconvolutional layer, the first motion feature, to obtain a first decoded value;
    denormalizing, by a first denormalization layer, the first decoded value, to obtain a first denormalized value;
    deconvoluting, by an $n^{th}$ deconvolutional layer, an $(n-1)^{th}$ denormalized value output by an $(n-1)^{th}$ denormalization layer, to obtain an $n^{th}$ decoded value;
    normalizing, by an $n^{th}$ denormalization layer, the $n^{th}$ decoded value, to output an $n^{th}$ denormalized value; and
    deconvoluting, by an $N^{th}$ deconvolutional layer, an $(N-1)^{th}$ denormalized value, to obtain the second motion information,
    where n is a positive integer greater than 1 and smaller than the N, and N denotes a number of deconvolutional layers.

7. The method of claim 1, further comprising:
    encoding the first residual information to obtain a first residual feature; and
    quantizing the first residual feature to obtain a second residual feature,
    wherein the second residual feature and a second motion feature formed based on the first motion information are constituent parts of the video compression information.

8. The method of claim 3, wherein obtaining the current prediction frame based on the previous reconstruction frame and the second motion information comprises:

splicing the previous reconstruction frame, the second motion information and a projection frame to obtain a first splicing frame, the projection frame being generated based on convolution of the previous reconstruction frame and the second motion information;

convoluting the first splicing frame to obtain a first convolutional frame;

performing (S+1) times of first residual processing and S times of pooling processing based on the first convolutional frame, to obtain a first intermediate frame, the first residual processing and the pooling processing being performed alternately;

performing (S+1) times of second residual processing and S times of upsampling processing on the first intermediate frame, to obtain a second intermediate frame, the second residual processing and the upsampling processing being performed alternately;

performing second convolutional processing on the second intermediate frame to obtain a second convolutional frame; and performing third convolutional processing on the second convolutional frame to obtain the current prediction frame, wherein the upsampling processing is performed in a bilinear interpolation manner.

9. An electronic device, comprising:

a memory having computer executable instructions stored therein; and a processor, connected to the memory, and configured, when executing computer executable instructions stored in the memory, to:

perform video compression by using an end-to-end model trained with a single loss function, to obtain video compression information, wherein the processor is configured to:

obtain first motion information according to a current original frame and a previous reconstruction frame;

obtain a current prediction frame according to the first motion information and the previous reconstruction frame; and obtain first residual information according to the current original frame and the current prediction frame, the first motion information and the first residual information forming the video compression information, wherein a loss value of the end-to-end model is determined with the single loss function, based on the first motion information, the first residual information, the current original frame, and the current prediction frame.

10. The electronic device of claim 9, wherein the processor is further configured to:

obtain a current reconstruction frame according to the first residual information and the current prediction frame, the current reconstruction frame and a next original frame being used jointly to obtain the first motion information for compression of the next original frame.

11. The electronic device of claim 9, wherein the processor is configured to:

encode the first motion information to obtain a first motion feature;

quantize the first motion feature to obtain a second motion feature;

decode the second motion feature to obtain second motion information; and obtain the current prediction frame based on the previous reconstruction frame and the second motion information.

12. The electronic device of claim 11, wherein the processor is configured to:

convolute, at a first convolutional layer, the first motion information to obtain a first encoded value;

normalize, at a first normalization layer, the first encoded value to obtain a first normalized value;

convolute, at an $n^{th}$ convolutional layer, an $(n-1)^{th}$ normalized value output by an $(n-1)^{th}$ normalization layer to obtain an $n^{th}$ encoded value;

normalize, at an $n^{th}$ normalization layer, the $n^{th}$ encoded value to obtain an $n^{th}$ normalized value; and normalizing, by an $N^{th}$ convolutional layer, an $(N-1)^{th}$ normalized value to obtain the first motion feature, where n is a positive integer greater than 1 and smaller than N, and N denotes a number of convolutional layers.

13. The electronic device of claim 11, wherein the processor is configured to:

deconvolute, at a first deconvolutional layer, the first motion feature to obtain a first decoded value;

denormalize, at a first denormalization layer, the first decoded value to obtain a first denormalized value;

deconvolute, at an $n^{th}$ deconvolutional layer, an $(n-1)^{th}$ denormalized value output by an $(n-1)^{th}$ denormalization layer to obtain an $n^{th}$ decoded value;

normalize, at an $n^{th}$ denormalization layer, the $n^{th}$ decoded value to output an $n^{th}$ denormalized value; and deconvolute, at an $N^{th}$ deconvolutional layer, an $(N-1)^{th}$ denormalized value to obtain the second motion information, where n is a positive integer greater than 1 and smaller than N, and N denotes a number of deconvolutional layers.

14. The electronic device of claim 9, wherein the processor is further configured to:

encode the first residual information to obtain a first residual feature; and quantize the first residual feature to obtain a second residual feature, wherein the second residual feature and a second motion feature formed based on the first motion information are constituent parts of the video compression information.

15. The electronic device of claim 11, wherein the processor is configured to:

splice the previous reconstruction frame, the second motion information and a projection frame to obtain a first splicing frame, the projection frame being generated based on convolution of the previous reconstruction frame and the second motion information; and convolute the first splicing frame to obtain a first convolutional frame;

perform (S+1) times of first residual processing and S times of pooling processing based on the first convolutional frame to obtain a first intermediate frame, the first residual processing and the pooling processing being performed alternately;

perform (S+1) times of second residual processing and S times of upsampling processing on the first intermediate frame to obtain a second intermediate frame, the second residual processing and the upsampling processing being performed alternately;

perform second convolutional processing on the second intermediate frame to obtain a second convolutional frame; and perform third convolutional processing on the second convolutional frame to obtain the current prediction frame, wherein the upsampling processing is performed in a bilinear interpolation manner.

16. A non-transitory computer storage medium, storing computer executable instructions, which, executed by a processor, cause the processor to implement a method comprising:

performing video compression by using an end-to-end model trained with a single loss function, to obtain video compression information, comprising:

obtaining first motion information according to a current original frame and a previous reconstruction frame;

obtaining a current prediction frame according to the first motion information and the previous reconstruction frame; and obtaining first residual information according to the current original frame and the current prediction frame, the first motion information and the first residual information forming the video compression information, wherein a loss value of the end-to-end model is determined with the single loss function, based on the first motion information, the first residual information, the current original frame, and the current prediction frame.

* * * * *